(12) United States Patent
Biggs

(10) Patent No.: US 11,006,748 B2
(45) Date of Patent: May 18, 2021

(54) INSECT INFESTATION REDUCTION METHOD

(71) Applicant: Barbara Biggs, Balaclava (AU)

(72) Inventor: Barbara Biggs, Balaclava (AU)

( * ) Notice: Subject to any disclaimer, the term of this patent is extended or adjusted under 35 U.S.C. 154(b) by 0 days.

(21) Appl. No.: 16/132,498

(22) Filed: Sep. 17, 2018

(65) Prior Publication Data

US 2019/0014903 A1    Jan. 17, 2019

Related U.S. Application Data

(63) Continuation of application No. 15/351,466, filed on Nov. 15, 2016, now abandoned, which is a
(Continued)

(30) Foreign Application Priority Data

| | | |
|---|---|---|
| Jun. 29, 2009 | (AU) | 2009202604 |
| Sep. 18, 2009 | (AU) | 2009217387 |
| Sep. 25, 2009 | (AU) | 2009220032 |
| Mar. 26, 2010 | (AU) | 2010201239 |
| May 20, 2010 | (AU) | 2010202044 |

(51) Int. Cl.
*A01M 29/34* (2011.01)
*A47B 91/14* (2006.01)
(Continued)

(52) U.S. Cl.
CPC ............. *A47B 91/14* (2013.01); *A01M 29/34* (2013.01); *A47C 19/024* (2013.01); *A47C 21/00* (2013.01); *A47C 31/007* (2013.01)

(58) Field of Classification Search
CPC ............ A01M 1/00; A01M 1/18; A01M 1/10; A01M 1/103; A01M 1/20; A01M 1/2011; A01M 1/24; A01M 29/34; A01M 29/30; A01M 29/00; A47C 31/007; A47B 91/14
USPC ........ 43/123, 109, 108, 132.1, 124; 47/32.4, 47/32.5; 52/101; 119/57.9; 16/2.1, 2.3; 248/49, 56, 74.1, 74.2
See application file for complete search history.

(56) References Cited

U.S. PATENT DOCUMENTS

| | | | | |
|---|---|---|---|---|
| 2,902 A | * | 1/1843 | Sanderson ............ | A01M 29/34 43/109 |
| 161,032 A | * | 3/1875 | Hawkins ......................... | 43/123 |

(Continued)

FOREIGN PATENT DOCUMENTS

| | | |
|---|---|---|
| AU | 2009100497 | 7/2009 |
| CA | 2148032 A1 * | 10/1996 |

(Continued)

OTHER PUBLICATIONS

Translation of JP 2008-183003 (Year: 2008).*

*Primary Examiner* — Darren W Ark
(74) *Attorney, Agent, or Firm* — The Law Office of Kevin McDermott, PLLC

(57) ABSTRACT

A method of preventing infestation of a bed by creeping insects; said method including the application of a barrier to the legs of said bed; said barrier comprising a disc or layer of material inimical to at least a selection of said creeping insects; said disc or layer interposed between an upper end of each bed leg and the underside surface of a bed base of said bed.

14 Claims, 7 Drawing Sheets

Related U.S. Application Data continuation of application No. 14/749,663, filed on Jun. 25, 2015, now abandoned, which is a continuation of application No. 13/380,057, filed as application No. PCT/AU2010/000810 on Jun. 29, 2010, now abandoned.

(60) Provisional application No. 62/299,134, filed on Feb. 24, 2016.

(51) Int. Cl.
*A47C 21/00* (2006.01)
*A47C 31/00* (2006.01)
*A47C 19/02* (2006.01)

(56) References Cited

U.S. PATENT DOCUMENTS

| | | | | |
|---|---|---|---|---|
| 168,306 A * | 9/1875 | Watkins | | 43/123 |
| 255,179 A * | 3/1882 | Mason | | A01M 29/34 43/109 |
| 293,463 A * | 2/1884 | Hogeboom | | A01M 1/18 43/108 |
| 304,343 A * | 9/1884 | Merrill | | A01M 1/18 43/108 |
| 391,930 A * | 10/1888 | Wilson | | 43/123 |
| 423,190 A * | 3/1890 | Stillman | | A01M 29/34 43/109 |
| 431,815 A * | 7/1890 | Linder | | A01M 29/34 43/109 |
| 514,946 A * | 2/1894 | Long | | A01M 29/34 43/109 |
| 528,210 A | 10/1894 | Schlientz et al. | | |
| 593,445 A * | 11/1897 | Toal | | A47C 17/84 5/279.1 |
| 616,049 A * | 12/1898 | Archer | | A01M 1/223 43/112 |
| 694,208 A * | 2/1902 | Smith | | A01M 1/18 43/108 |
| 694,738 A * | 3/1902 | Goldberg | | A01M 29/34 43/109 |
| 824,272 A * | 6/1906 | Alexander | | A01M 29/34 43/109 |
| 898,852 A * | 9/1908 | Duggan | | A01M 29/34 43/109 |
| 1,005,567 A * | 10/1911 | McDonald | | 43/123 |
| 1,093,291 A * | 4/1914 | Quist | | A01M 29/34 43/109 |
| 1,095,906 A * | 5/1914 | McCord | | A01M 29/34 43/109 |
| 1,164,219 A * | 12/1915 | Rush | | A47B 91/00 248/188.8 |
| 1,213,638 A * | 1/1917 | Henderson | | A01M 29/34 43/109 |
| 1,305,450 A * | 6/1919 | Evans | | A01K 31/12 119/533 |
| 1,305,553 A * | 6/1919 | Kruse | | A01M 29/34 43/109 |
| 1,325,316 A * | 12/1919 | Diss | | B60B 33/0002 16/21 |
| 1,390,734 A * | 9/1921 | Stevens | | A01M 29/34 43/109 |
| 1,405,822 A * | 2/1922 | Erickson | | A01M 29/34 43/109 |
| 1,455,100 A * | 5/1923 | Belnap | | A01M 1/02 43/109 |
| 1,464,397 A * | 8/1923 | Royak | | A47C 29/006 5/658 |
| 1,497,966 A * | 6/1924 | Wiley | | A47B 91/14 43/109 |
| 1,581,410 A * | 4/1926 | Welsh | | A01M 1/14 US 43/109 |
| 1,633,438 A * | 6/1927 | De Pew | | A01M 29/34 43/109 |
| 1,697,814 A * | 1/1929 | Forbes | | F16F 1/3732 16/2.1 |
| 2,060,931 A * | 11/1936 | Fischer | | A01M 29/34 43/109 |
| 2,233,832 A * | 3/1941 | Byrd | | A01G 13/105 43/107 |
| 2,261,360 A * | 11/1941 | Gerendas | | A01G 13/105 43/108 |
| 2,454,707 A * | 11/1948 | Meyers | | D01H 7/602 16/2.1 |
| 2,483,874 A * | 10/1949 | Bernhard | | B63B 21/12 114/221 R |
| 2,717,792 A * | 9/1955 | Pelley | | F16J 15/50 248/56 |
| 3,679,249 A * | 7/1972 | Hoffmann | | F16C 11/04 403/69 |
| 3,695,652 A * | 10/1972 | Ratnikas | | F16C 11/04 403/69 |
| 3,714,733 A * | 2/1973 | Madonna | | A01M 1/24 43/121 |
| 3,768,115 A * | 10/1973 | Hoffmann | | F16C 11/04 16/2.1 |
| 4,181,337 A * | 1/1980 | Muller | | E05C 17/14 16/404 |
| 4,471,562 A * | 9/1984 | Brucker | | A01G 13/105 43/108 |
| 4,637,164 A * | 1/1987 | Brown | | A01G 13/105 43/106 |
| 4,656,689 A * | 4/1987 | Dennis | | F16L 5/027 248/56 |
| 4,667,523 A * | 5/1987 | Becker | | G01N 27/283 73/866.5 |
| 4,685,172 A * | 8/1987 | O'Connor | | F16C 35/04 16/2.1 |
| 5,148,626 A * | 9/1992 | Haake, Sr. | | A01K 5/0142 119/61.53 |
| 5,178,479 A * | 1/1993 | Brown | | E05B 79/12 248/74.2 |
| 5,211,695 A * | 5/1993 | Dowler | | F16L 5/00 16/2.1 |
| 5,274,950 A * | 1/1994 | Roberts | | A01M 1/245 43/121 |
| 5,287,648 A * | 2/1994 | Hand | | A01K 5/0142 43/108 |
| 5,353,556 A * | 10/1994 | Hand | | A01G 13/105 43/108 |
| 5,381,557 A * | 1/1995 | Luria | | A01M 1/14 2/16 |
| 5,392,559 A * | 2/1995 | Long | | A01G 13/105 43/108 |
| 5,414,954 A * | 5/1995 | Long | | A01G 13/105 43/108 |
| 5,561,941 A * | 10/1996 | Long | | A01G 13/105 43/108 |
| 5,566,500 A * | 10/1996 | Long | | A01G 13/105 43/108 |
| 5,826,542 A * | 10/1998 | Allen | | H02G 7/00 119/57.9 |
| 6,223,463 B1 * | 5/2001 | Carlson | | A01G 13/105 43/108 |
| 6,505,433 B2 * | 1/2003 | Roberts | | A01M 29/34 16/32 |
| 6,513,281 B2 * | 2/2003 | Roberts | | A01M 29/34 248/188.4 |
| 6,640,488 B2 * | 11/2003 | Roberts | | A01M 29/34 119/61.53 |
| 6,837,008 B2 * | 1/2005 | Roberts | | A01M 29/34 174/480 |
| 6,912,815 B1 * | 7/2005 | Koehler | | A01G 13/105 52/101 |
| 6,995,317 B1 * | 2/2006 | Dzurilla | | B60R 16/0222 16/2.1 |
| 7,024,826 B2 * | 4/2006 | Roberts | | A01G 13/105 43/131 |

(56) References Cited

U.S. PATENT DOCUMENTS

| | | | |
|---|---|---|---|
| 7,108,269 B2* | 9/2006 | Benkel | B62D 25/24 16/2.1 |
| 7,276,665 B1* | 10/2007 | Rauckman | H01B 17/00 174/135 |
| 7,644,546 B2* | 1/2010 | Middleton | A01M 1/24 43/107 |
| 7,676,985 B1* | 3/2010 | Perkins | A01M 1/026 43/114 |
| D668,314 S | 10/2012 | Mackay | |
| 8,341,804 B2* | 1/2013 | Yoshii | B60R 13/0206 16/2.1 |
| 8,413,370 B2* | 4/2013 | Messian | A01M 1/14 43/114 |
| 8,500,072 B2* | 8/2013 | Ayme | H02G 3/22 248/74.1 |
| 8,707,615 B2* | 4/2014 | Cullen | A01M 29/34 43/123 |
| 8,789,309 B2* | 7/2014 | Fabry | A01M 1/026 43/114 |
| 9,179,783 B2* | 11/2015 | Snell | A47C 31/007 |
| 9,220,254 B2* | 12/2015 | Dong | A01M 1/14 |
| 10,172,341 B2* | 1/2019 | Simpson | A01M 1/14 |
| 2001/0052206 A1* | 12/2001 | Roberts | A01M 29/34 52/101 |
| 2002/0059748 A1 | 5/2002 | Roberts | |
| 2004/0040199 A1* | 3/2004 | Thompson | A01G 13/105 43/108 |
| 2005/0241219 A1* | 11/2005 | Roberts | A01M 29/34 47/32.4 |
| 2008/0187564 A1* | 8/2008 | Momiyama | A01M 29/34 424/405 |
| 2009/0223115 A1* | 9/2009 | Lang | A01M 1/14 43/114 |
| 2009/0272872 A1* | 11/2009 | Hoffman | F16F 1/44 248/673 |
| 2010/0043274 A1* | 2/2010 | Battick | A01M 1/14 43/114 |
| 2010/0043275 A1* | 2/2010 | Battick | A01M 1/14 43/114 |
| 2010/0107515 A1* | 5/2010 | Harrington | A01M 1/14 52/101 |
| 2010/0212213 A1* | 8/2010 | Hope, III | A01M 1/026 43/123 |
| 2011/0107654 A1* | 5/2011 | Wieler | A01M 1/2011 43/131 |
| 2011/0225873 A1* | 9/2011 | McKnight | A01M 29/00 43/123 |
| 2012/0096759 A1* | 4/2012 | Biggs | A47B 91/14 43/107 |
| 2012/0159874 A1* | 6/2012 | Harrington | A01M 1/14 52/101 |
| 2012/0167309 A1* | 7/2012 | Heidorn | A47C 31/007 5/691 |
| 2013/0025185 A1* | 1/2013 | O'Connor | A01M 29/34 43/121 |
| 2013/0042520 A1 | 2/2013 | Snell | |
| 2013/0067796 A1 | 3/2013 | Dong et al. | |
| 2013/0111801 A1 | 5/2013 | White et al. | |
| 2013/0269238 A1* | 10/2013 | Bronk | A01M 1/223 43/112 |
| 2014/0215898 A1* | 8/2014 | Hsu | A01M 29/34 43/121 |
| 2014/0259879 A1* | 9/2014 | Logsdon | A01M 1/2011 43/114 |
| 2014/0317994 A1* | 10/2014 | Bodo | A01M 1/103 43/108 |
| 2014/0359948 A1* | 12/2014 | Middlesworth | A47C 31/00 5/690 |
| 2015/0075060 A1* | 3/2015 | Balsam | A01M 1/026 43/123 |
| 2015/0237842 A1* | 8/2015 | Thuis | A01M 1/103 43/114 |
| 2015/0305318 A1* | 10/2015 | Moriarty | B25B 7/126 43/113 |
| 2015/0327533 A1* | 11/2015 | Jenkins | A01N 63/30 424/409 |
| 2016/0007586 A1* | 1/2016 | Emanuel | B60R 15/00 47/32.6 |
| 2016/0183511 A1* | 6/2016 | Dong | A01M 1/14 43/114 |
| 2016/0198692 A1* | 7/2016 | Simpson | A01M 1/14 43/114 |
| 2016/0262366 A1* | 9/2016 | Rola | A01M 1/14 |

FOREIGN PATENT DOCUMENTS

| | | | | |
|---|---|---|---|---|
| DE | 9206085 | | 10/1993 | |
| EP | 1683440 | | 7/2006 | |
| EP | 1683440 A1 | * | 7/2006 | A01K 31/12 |
| EP | 3440935 A1 | * | 2/2019 | A01M 29/30 |
| EP | 3560333 A1 | * | 10/2019 | A01M 29/34 |
| GB | 647301 | | 12/1950 | |
| GB | 705090 A | * | 3/1954 | |
| GB | 2428362 A | * | 1/2007 | |
| GB | 2446560 A | * | 8/2008 | |
| GB | 2478887 A | * | 9/2011 | A47C 31/007 |
| GB | 2543505 A | * | 4/2017 | A01M 29/34 |
| JP | 2008-183003 | | 8/2008 | |
| JP | 2008183003 A | * | 8/2008 | |
| JP | 5106566 B2 | * | 12/2012 | |
| WO | WO-9906644 A1 | * | 2/1999 | |
| WO | WO-2009090628 A2 | * | 7/2009 | |
| WO | 2010103266 | | 9/2010 | |
| WO | WO-2010103266 A1 | * | 9/2010 | A01M 29/34 |
| WO | 2011151627 | | 12/2011 | |
| WO | WO-2011151627 A1 | * | 12/2011 | A01M 29/34 |
| WO | WO-2014186977 A1 | * | 11/2014 | A47B 91/14 |

\* cited by examiner

| Date Read | Adult | | Nymph | | | | | Total |
|---|---|---|---|---|---|---|---|---|
| | Female | Male | 1 | 2 | 3 | 4 | 5 | |
| 4-Feb-10 | 74 | 69 | 224 | 94 | 18 | 10 | 16 | 602 |
| 5-Feb-10 | 1 | 2 | 47 | 9 | 2 | 0 | 1 | 62 |
| 6-Feb-10 | 0 | 1 | 2 | 0 | 0 | 0 | 0 | 3 |
| 7-Feb-10 | 0 | 4 | 6 | 1 | 0 | 0 | 1 | 12 |
| 8-Feb-10 | 0 | 1 | 6 | 0 | 0 | 0 | 1 | 8 |
| 9-Feb-10 | 0 | 2 | 2 | 1 | 0 | 1 | 0 | 6 |
| 10-Feb-10 | 0 | 0 | 0 | 0 | 0 | 0 | 0 | 0 |
| Total | 75 | 79 | 287 | 105 | 18 | 11 | 18 | 693 |
| Non-breach | 0 | 3 | 19 | 0 | 1 | 1 | 1 | 25 |
| Grand Total | 75 | 82 | 308 | 105 | 19 | 12 | 18 | 618 |

Table A

| Date Read | Adult | | Nymph | | | | | Total |
|---|---|---|---|---|---|---|---|---|
| | Female | Male | 1 | 2 | 3 | 4 | 5 | |
| 4-Feb-10 | 0 | 0 | 0 | 0 | 0 | 0 | 0 | 0 |
| 5-Feb-10 | 0 | 0 | 0 | 0 | 0 | 0 | 0 | 0 |
| 6-Feb-10 | 0 | 0 | 0 | 0 | 0 | 0 | 0 | 0 |
| 7-Feb-10 | 0 | 0 | 0 | 0 | 0 | 0 | 0 | 0 |
| 8-Feb-10 | 0 | 0 | 0 | 0 | 0 | 0 | 0 | 0 |
| 9-Feb-10 | 0 | 0 | 0 | 0 | 0 | 0 | 0 | 0 |
| 10-Feb-10 | 0 | 0 | 0 | 0 | 0 | 0 | 0 | 0 |
| Total | 0 | 0 | 0 | 0 | 0 | 0 | 0 | 0 |
| Non-breach | 72 | 85 | 281 | 78 | 25 | 15 | 28 | 584 |
| Grand Total | 72 | 85 | 281 | 78 | 25 | 15 | 28 | 584 |

Table B

Fig. 9

INSECT INFESTATION REDUCTION METHOD

The present invention relates to pest control and, more particularly, to bed bug and other creeping insect infestation minimisation technology.

BACKGROUND

One example of an insect likely to infest is the common bed bug, (*Cimex lectularius*), a small insect, adults growing to 4-5 mm, found throughout the temperate world. It feeds on blood and is well adapted to cohabitation with humans, particularly preferring to infest bedding.

Infestation is a particular problem in those facilities catering to revolving clientele, such as hotels, guest houses, backpacker hostels and other forms of guest accommodation, but can also become a serious problem in the home.

Infestation of a bed may occur in at least two ways. Firstly, bugs may be introduced into the bed from luggage, contaminated clothing or even from human carriers. Secondly, bugs may initially be present in carpets or rugs and thence find their way into the bed by crawling up the bed supporting structure.

Although infestation by bed bugs is perhaps the most common problem, it is clearly undesirable to have one's bed invaded by any creeping insects.

Various attempts have been made to solve problems found in pest control art. Among these are found in: U.S. Patent and Publication Nos. 2013/0067796 to Dong et al., 2013/0042520 to Snell, 2013/0111801 to White et al., 2011/0225873 to McKnight et al., D668,314 to MacKay et al., and 2012/0096759 to Biggs. This prior art is representative of pest control means.

None of the above inventions and patents, taken either singly or in combination, is seen to describe the invention as claimed. Thus, a need exists for a reliable insect infestation reduction system, and to avoid the above-mentioned problems.

It is an object of the present invention to address or at least ameliorate the problem of insect infestation routes.

Notes

1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in one broad from of the invention there is provided a method of preventing infestation of a bed or other item of furniture by creeping insects; said method including the application of a barrier at the legs of said bed or furniture; said barrier comprising at least one disc or layer of material inimical to at least a selection of said creeping insects; said disc or layer interposed between a ground surface and the underside surface of a bed base of said bed or between a ground surface and an upper structure of said furniture.

Preferably at least one said disc or layer has a low coefficient of friction surface; said surface having properties preventing a creeping insect traversing a substantially horizontal underside of said disc or layer. Preferably said properties include a low coefficient of friction and resistance to van der Waal forces.

Preferably said low coefficient of friction of said surface is a dynamic coefficient of friction less than 0.4.

Preferably said disc layer is composed of polytetrafluoroethylene or similar compounds; such compounds commonly known as Teflon®.

Preferably said disc or layer is sized so as to extend beyond the periphery of said bed leg; an extended portion of said disc or layer forming a substantially horizontal annular underside surface beyond said periphery.

Preferably said disc or layer is provided with a central aperture; said aperture sized so as to allow passage therethrough of a securing bolt of said bed leg.

Preferably said disc comprises a dual ring assembly; the assembly including an outer ring and an inner ring affixed to said outer ring; the outer ring formed of a substantially rigid polymer with said low coefficient of friction; the inner ring formed of a flexible polymer; each said outer ring and said inner ring provided with a central aperture.

Preferably flexibility of said inner ring, provides for said dual ring assembly to be retained on a leg of a bed or other item of furniture passing through said aperture in said inner ring; said dual ring assembly retained on said leg by friction between said leg and said flexible inner ring.

In yet a further broad form of the invention there is provided a method of reducing infestation of a bed by climbing insects; said method including interposing insect impeding barriers at supporting elements of said bed; said method including the steps of:
(a) detaching each supporting element of said bed;
(b) applying said insect impeding barrier to an upper end of said supporting element;
(c) re-attaching said supporting elements to said bed such that said barrier is interposed between said upper end of said supporting element and an underside of said bed.

Preferably said supporting element is a bed leg; said bed leg attaching to an underside of a bed base of said bed by a length of threaded rod projecting from said upper end of said bed leg; said barrier formed as a disc or layer of low friction material; said disc or layer sized to project radially from a periphery of said bed leg so as to expose an annular surface of said low friction material forming a substantially horizontal underside surface between a periphery of said bed leg and said underside of said bed.

Preferably said method includes the further steps of interposing offset blocks between a bed head of said bed and an adjacent wall; said offset blocks including an insect impeding barrier.

Preferably said insect impeding barrier includes application of a low coefficient of friction tape to surfaces of said offset blocks; said offset blocks configured so as to present one or more upwardly sloping upper surface only, between said bed head and said adjacent wall.

Preferably said insect impeding barrier includes a ring of low coefficient of friction material; said ring of material including vertical surfaces projecting radially from surfaces of said offset blocks.

In yet a further broad form of the invention there is provided a method of preventing infestation by creeping insects of a bed or other elevated structure; said method including the application of a barrier in the form of a gasket or washer to the legs or substructure of said bed or other elevated structure; said barrier comprising a band of a material inimical to at least a selected group of said creeping insects.

Preferably said band of material is treated with a compound; said compound having properties repulsive to at least a group of said creeping insects.

Preferably said gasket or washer is formed of a porous material; said compound impregnated into said porous material.

In yet a further broad form of the invention there is provided a disc of material forming a barrier extending generally radially from a periphery of a bed leg between a floor surface and a bed base; said disc of material inimical to traversing by bed bugs and other creeping insects; said disc comprising a dual ring assembly of an outer ring and an inner ring affixed to said outer ring; said outer ring presenting an exposed substantially horizontal underside, annular portion, of low coefficient of friction material.

Preferably said disc is provided with a central aperture for placement of said discover a central securing bolt of a said bed leg or around said bed leg.

In yet a further broad form of the invention there is provided a kit for providing protection of infestation of a bed by bed bugs and other climbing insets; said kit comprising packaging containing a number of discs or layers of a low coefficient of friction material; said discs or layers adapted for interposing between upper portions of bed legs and the underside of a bed base of said bed.

BRIEF DESCRIPTION OF DRAWINGS

Embodiments of the present invention will now be described with reference to the accompanying drawings wherein:

FIG. 9 shows tables summarizing results of the experiments of FIG. 8.

DETAILED DESCRIPTION OF PREFERRED EMBODIMENTS

First Preferred Embodiment

The present invention seeks to reduce the incidence of bed bug and other creeping insect infestation of beds by substantially eliminating one route by which creeping insects can gain access to a bed, or other elevated structure from a supporting ground surface.

Figure 1:
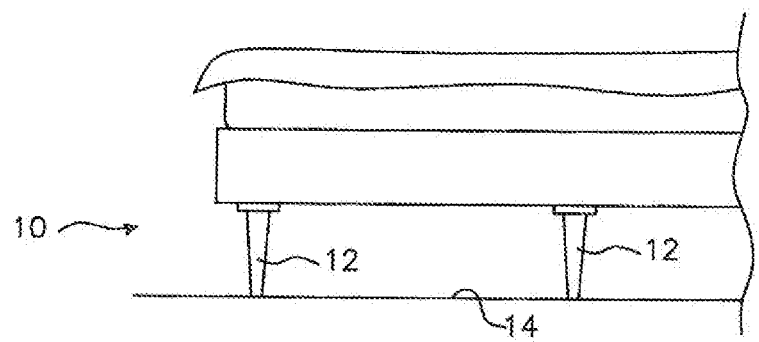
FIG. 1 is a side view of typical support structure of a bed base.
Figure 2:
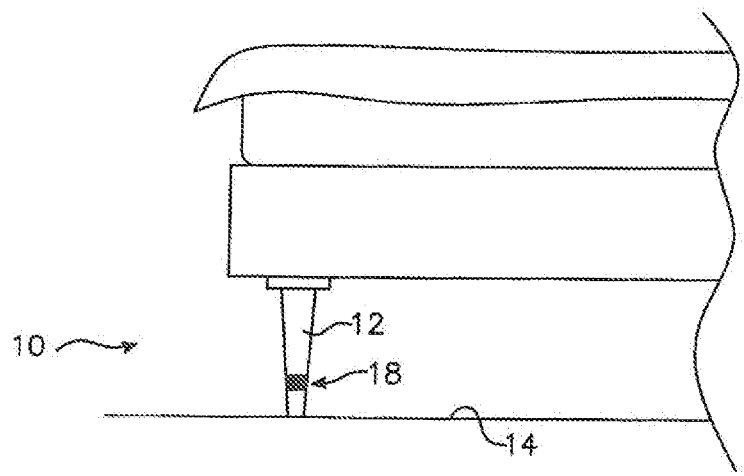
FIG. 2 is a side view of the support structure of FIG. 1 to which a preferred arrangement of the bed bug reduction method of the invention has been applied.
Figure 3:
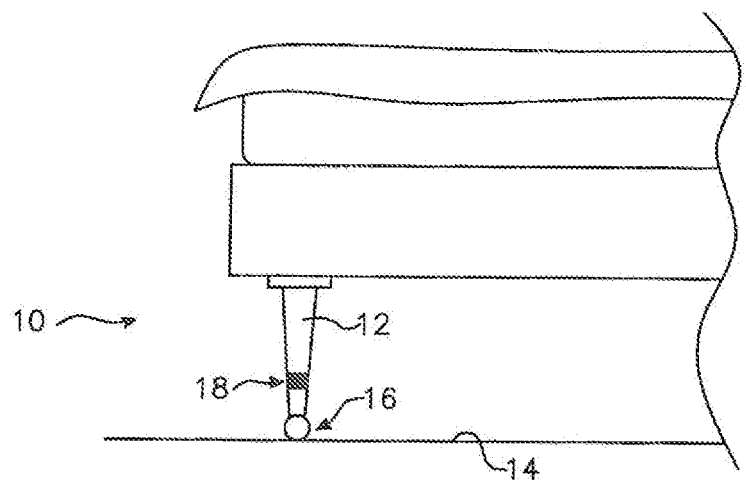
FIG. 3 is a side view of a support structure with castor when fitted with a castor and provided with the arrangement of the bed bug reduction method of FIG. 2.

With reference to FIGS. 1 and 2, bed bases 10 and other structures are frequently supported by four or more legs 12 resting directly on the floor 14 or the legs may be mounted on castors 16 as shown in FIG. 3. Typically, legs are manufactured of some suitable material such a wood, which although apparently smooth, provide ample purchase to bed bugs, which are excellent climbers, as are most other creeping insects. Nor do castors, typically formed of plastic or metal and plastic assemblies, provide any barrier to a bed bug or other creeping insect.

The present invention resides in the provision of a barrier located along the substantially vertical surfaces of supporting structures of bed bases and other elevated structures.

It has been found, that some materials with a sufficiently low coefficient of friction and resistance to van der Waal forces, when forming a substantially vertical surface, provide an effective barrier to climbing insects. Such materials include polytetrafluoroethylene or similar PTFE compounds such as that commonly known as Teflon® by the American chemical manufacturer Dupont. Depending on the particular grade and compound this material has a coefficient of friction of around 0.4.

In this first preferred embodiment, the present invention provides a method of creeping insect infestation reduction by the application of a low coefficient of friction material to the substantially vertical surfaces of the support structures of beds. Preferably, the dynamic coefficient of friction of the material is less than 0.4. The method described in this specification refers to the use of Teflon® but it will be understood that any material, with a coefficient of friction sufficiently low so as to deny purchase to a climbing creeping insects, is envisaged in the invention.

Referring again to FIGS. 2 and 3, it can be seen that at least a portion of the leg 12 has been provided with an annular coating 18 of Teflon® extending a sufficient distance up the leg to provide a barrier. The extent of the coating is preferably at least 10 mm, but more preferably is not less than 25 mm.

A Teflon® coating may be applied as a liquid to the material from which a bed leg is made. Alternately it may be applied as a film of material, or in another arrangement, at least a portion of the leg could be manufactured from Teflon® itself, for example in the form of "feet" affixed at the lower end of the leg.

Figure 4:
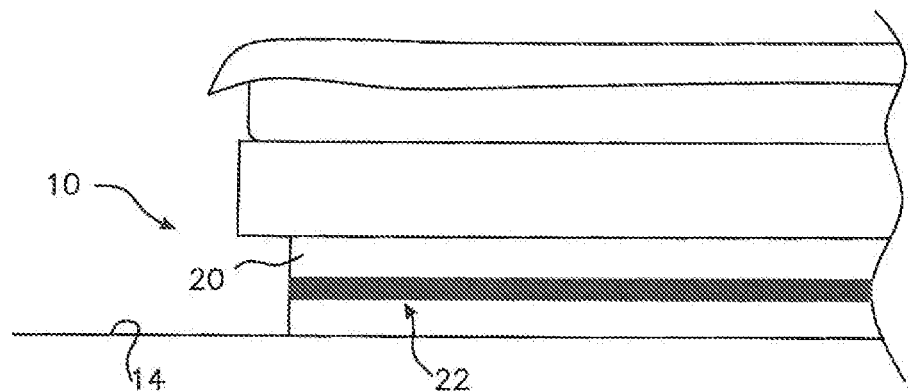
FIG. 4 is a side view of a portion of another typical support structure of a bed provided with the bed bug reduction method of the invention.

FIG. 4 shows another support structure for a bed base, in this case a perimeter frame 20 resting directly on the floor. In this situation, a band 22 of Teflon® material may be applied right around the frame to deny access to creeping insects.

Figure 5:
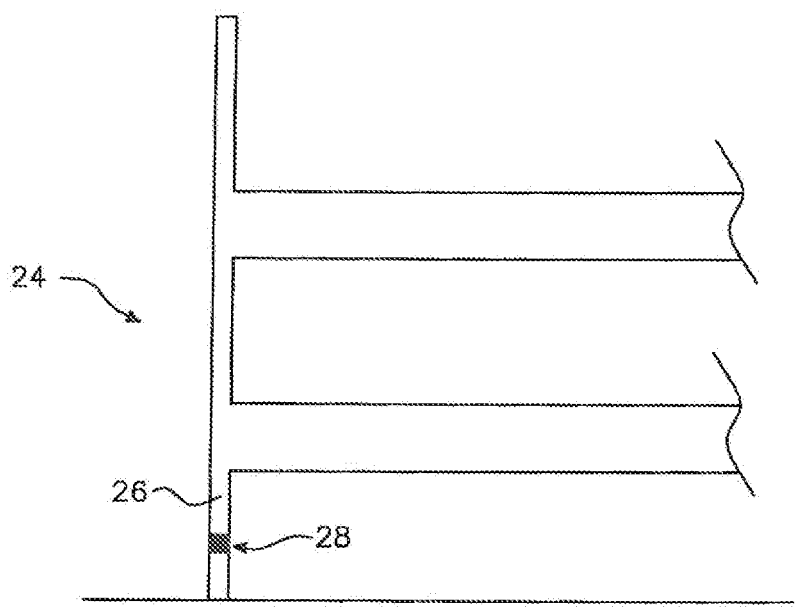
FIG. 5 is a side view of the framing of a bunk bed provided with the bed bug reduction method of the invention.

FIG. 5 shows a portion of a bunk bed, the framing 24 of which typically is also in direct contact with the floor. In this instance the prevention method of the invention is similar to that applied to the leg shown in FIG. 2, that is by applying a band 28 of Teflon® to at least a portion of each of the vertical frame members 26 of the bunk bed. Alternatively, as described above, Teflon® "feet" could be fitted at the base of each of the vertical frame members.

Second Preferred Embodiment

Figure 6:
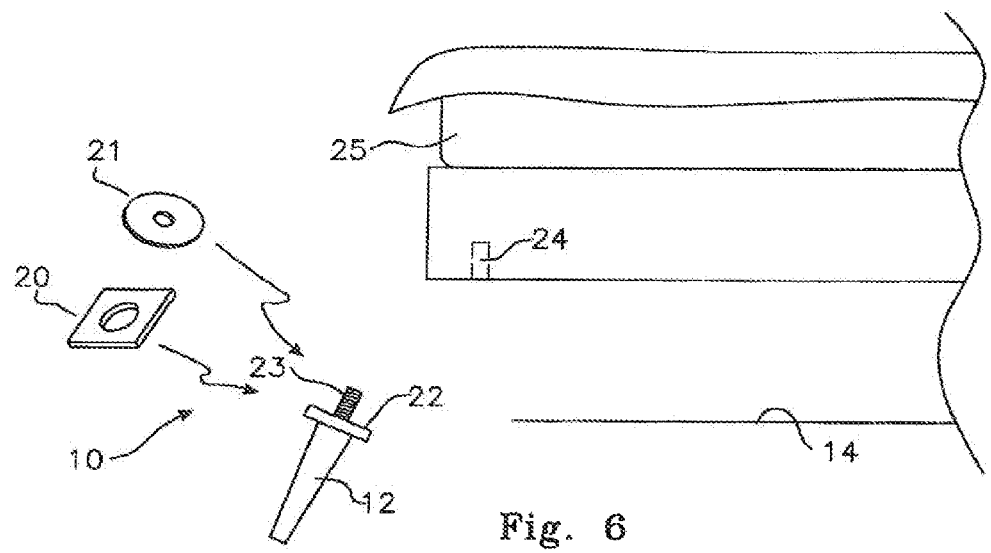
FIG. 6 is a side view of the method of installation according to a further embodiment of the present invention.
Figures 7, 7A:
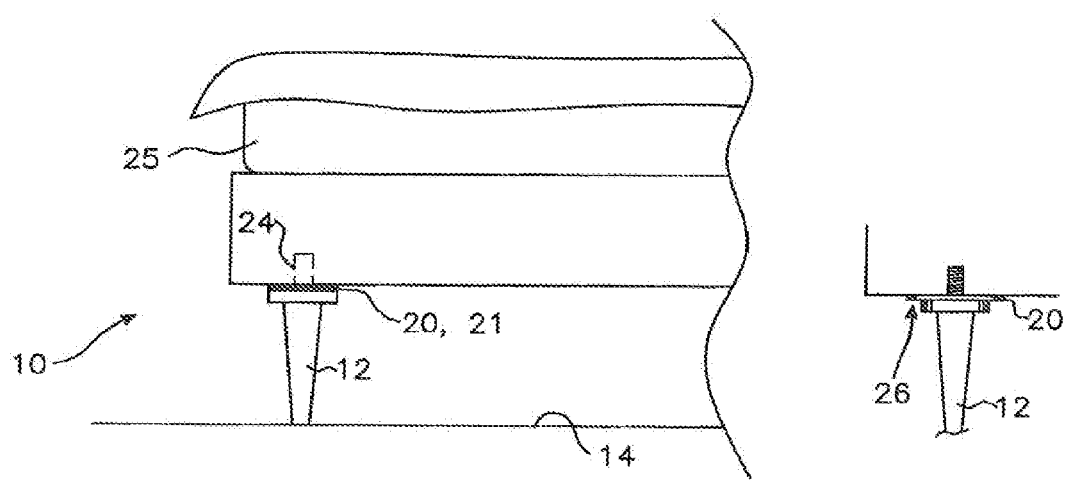
FIG. 7 is a side view of the bed after installation according to the method illustrated in FIG. 6.

With reference to FIGS. 6 and 7 there is illustrated a further methodology in accordance with a further preferred embodiment of the present invention. Like components are numbered as for the first embodiment above.

In this instance, the methodology for interrupting the route by which creeping insects can gain access to a bed or other elevated structure by means of its supporting legs or substructure, is by way of interposing a barrier, in this instance, in the form of a gasket 20 or washer 21.

In the preferred methodology the gasket or washer is made from Teflon, or similar low coefficient of friction material, and is preferably interposed along the route as a barrier. The steps of installation of the barrier, for example in the case of a bed supported on legs, include unscrewing the leg 12, placing the gasket or washer 20, 21 on the upper surface 22 of leg 12 around a length of threaded rod 23 projecting from the leg, reinstalling the leg 21 by screwing threaded rod 23 into a threaded recess 24, thereby to arrive by at the arrangement shown in FIG. 7. By this arrangement the washer or gasket 20, 21 provides a barrier entirely across the route which a creeping insect might take from surface 14 via exterior of leg 12 to the mattress 25.

By this arrangement, broadly speaking, there is disclosed the use of a barrier treated with (or made entirely from) Teflon® or similar material interposed between the floor and bed for the purposes of preventing or at least minimising the possibility of creeping insects from climbing from the floor to the bed or bedding. The barrier may take the form of the washer/disc or gasket as described above or it may take any other form of barrier. In the preferred form the barrier is arranged, as much as possible, to appear as part of the leg assembly so that it is not visually displeasing.

Although a very low coefficient material clearly has maximum effect if applied to a vertical surface, for some insects at least, a material such as Teflon, may also provide a significant impediment to at least some creeping insects when applied to a sloping or even an horizontal surface.

Third Preferred Embodiment

It will also be readily understood that a low friction surface may provide an even greater impediment to a crawling insect if that surface has significant negative slope, with the maximum effect achieved if the surface is a substantially horizontal underside. Thus in one preferred form of the gasket or washer shown in FIG. 7, the washer extends beyond the section of the leg to which it is applied as shown in FIG. 7A, thus creating an exposed annular, substantially horizontal, underside surface 26 as well as a further substantially vertical surface.

Figure 8:
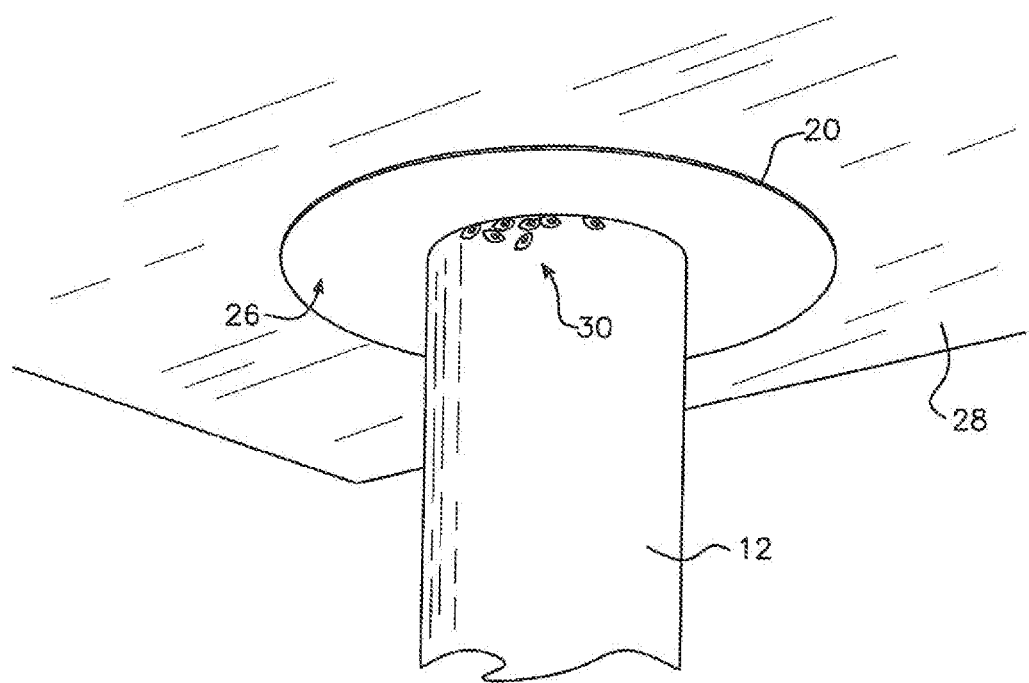
FIG. 8 is a perspective view of an experimental installation showing a further embodiment under test conditions.

In a particularly preferred arrangement shown in FIG. 8, the barrier fitted to a leg of a bed, may be comprised of a relatively thin disc or layer 20 of low friction material with a diameter, or in extent, significantly larger than the diameter or area of the upper end of leg 12. As previously described, the disc or layer 20 is provided with a central aperture of sufficient diameter to allow passage of the leg securing bolt, (as illustrated in FIG. 6), so that when the leg 12 is re-assembled to the bed, the disc or layer 20 is secured against the underside of the bed base 28.

Experiments have shown that the arrangement shown in FIG. 8 is one hundred percent effective in preventing bed bugs from traversing the disc 20 and gaining access to a bed base 28. The experiments included a typical bed base platform 28 of pressed timber construction, to which were attached a first group of bed legs 12 in the normal manner (the controls), and a second group of bed legs provided with the discs as shown in FIG. 8. A heat source, similar in heat output to that of a human body, was placed on the platform.

Each of the groups of legs were variously provided with a source of bed bugs, including one source each of adult male and female bugs, and five of nymph bugs.

Table A of FIG. 9 shows the result of bed bug infestation in the absence of protective barriers over a period of one week. It is clear that virtually all the bugs reached the bed base within the first two days of the experiment. In stark contrast, as shown in Table B, not one of the bugs was able to traverse the low friction material disc barrier 20. As illustrated in FIG. 8, bed bugs in the second group ascended the bed leg 12, but were unable to make the transition from the relatively rough vertical surface of the leg onto the low friction horizontal surface 26 of the disc 20, which in the experiment were made of Teflon®.

It appears from the above described experiment that any extension of the barrier, in the form of a disc, beyond the periphery of the bed leg, significantly wider than the length of the insects to be repelled, will prevent infestation. Preferably the projection of the disc beyond the periphery of the leg should be at least three insect lengths and thus preferably at least 15 mm for bed bugs.

Although the experiment was conducted with round bed legs and appropriately shaped disc barriers, it will be understood that the principles of the barrier may be equally well implemented with squares of the barrier material as long as the projection of the material beyond the leg periphery is sufficient.

FURTHER EMBODIMENTS

The arrangements described above have relied on the property of low coefficient of friction to provide a barrier to climbing insects, but other forms of barrier are envisaged by the present invention.

In one preferred arrangement the barrier may be formed by a surface coating which, although not necessarily having the property of low coefficient of friction, may be sufficiently unpleasant to the senses of insects as to dissuade them from traversing the barrier. Thus certain chemical compounds known to be inimical to insects or a particular group of insects to be guarded against, can be applied in similar manner to that described above; that is by a band of the compound applied around a supporting leg of a bed or the supporting substructure of an elevated structure. For example marine anti-fouling paint or like chemical composition may be suitable for some groups of insects. The suitable chemical compound may be impregnated into a porous material formed into a washer or gasket as described above and assembled to the upper portion of a bed leg. In this latter arrangement also, it is preferable if the washer or gasket extends significantly beyond the periphery of the upper end of the leg.

The formation of an insect barrier which relies on properties which promote aversion in an insect, need not of course be restricted to vertical surfaces. Thus a perimeter band of a chemically formulated material may be applied to a horizontal surface, or placed across a known route of insect infiltration.

Figure 10:
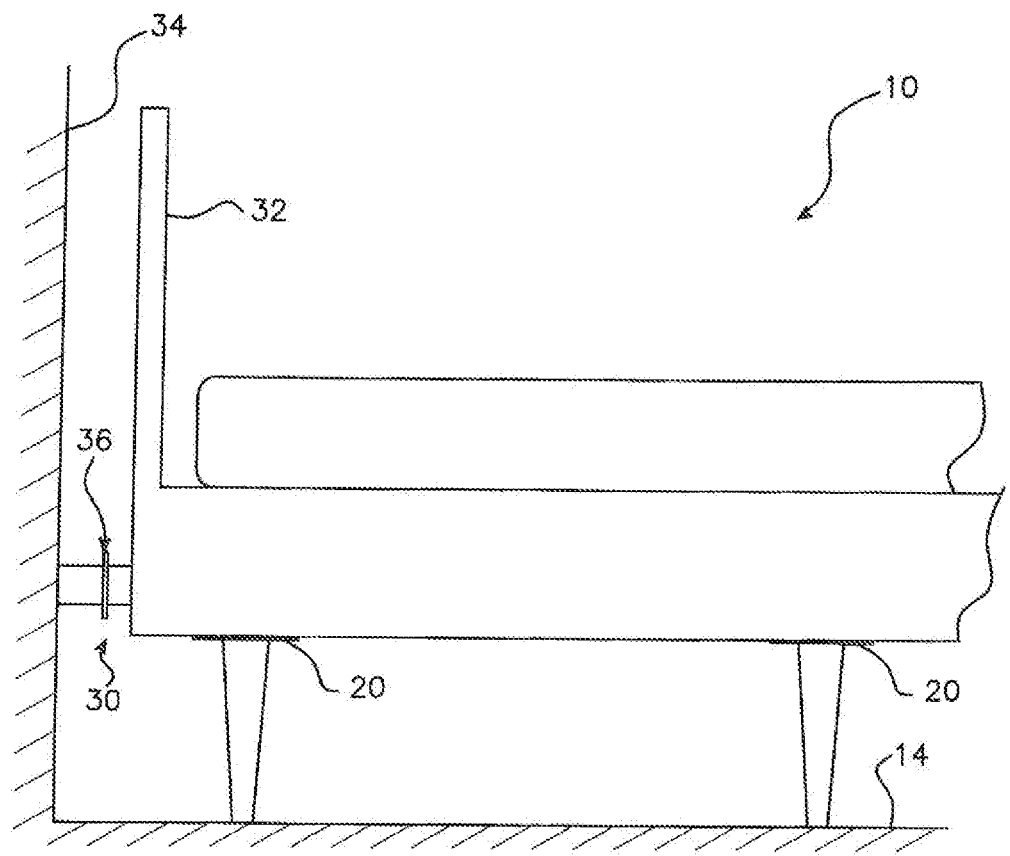
FIG. 10 shows a further embodiment of a bed bug reduction method according to the invention installed between a bed head and adjacent wall.

Although the legs supporting a bed may be the most common route of infestation by bed bugs, it will be appreciated that alternative routes may be available if the bed base or bedding is in contact with a separate bed head or a wall. To cover this contingency, suitably prepared offset blocks 30 may be provided between the bed head 32 and an adjacent wall 34 as shown in FIG. 10. These blocks are provided with similar bug impeding material, that is, for example by covering in Teflon® tape, or by impregnation or coating with a repellent chemical compound, such as for example, Gore-Tex and Kel-F, as described for the bed leg and bed support structures above.

Preferably, blocks for covering with Teflon® or other low coefficient of friction tape, are triangular in section and affixed to the bed head so as to present a sharp edge, for example the apex of an isosceles triangle, uppermost and extending between the wall and the bed head. Thus only steeply sloping surfaces are presented between the wall and the bed head. More preferably, the offsetting blocks 30 could be provided with a ring or gasket 36 of low coefficient of friction material, with the ring or gasket 36 arranged to present a vertical surface extending radially outwards from the block.

Figure 11:
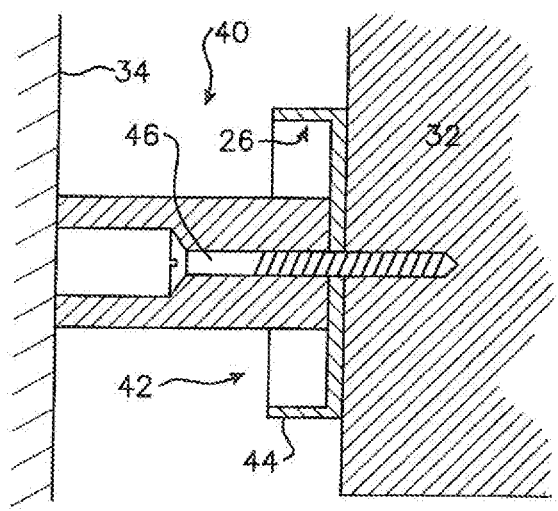
FIG. 11 shows a further embodiment of a bed bug barrier installed between a bed head and adjacent wall

In another preferred arrangement shown in FIG. 11, offset blocks 40 may be provided with a cup shaped barrier 42, formed of low coefficient of friction material, with outwardly extending rim 44, thus providing surface interfaces shown to be proof against traversing by bed bugs. In this arrangement, the cup shaped barrier may be secured between the offset block 40 and the surface of the bed head 32.

Offset blocks may be provided with a through aperture for accepting a securing screw 46 as shown in FIG. 10.

In each of the embodiments described above, the layer or disc of material, the offset blocks and low coefficient of friction tape, may conveniently be provided in packaged kit form suitable for retro-fitting to existing bed legs. Kits of discs with central apertures could be made available in a selection of shapes and sizes to suit, for example, typical square and circular section bed legs. The number of discs provided could vary for different bed configurations, for example ranging from perhaps four for a small single bed, to nine for a large double bed.

Figure 13:
Figure 14:
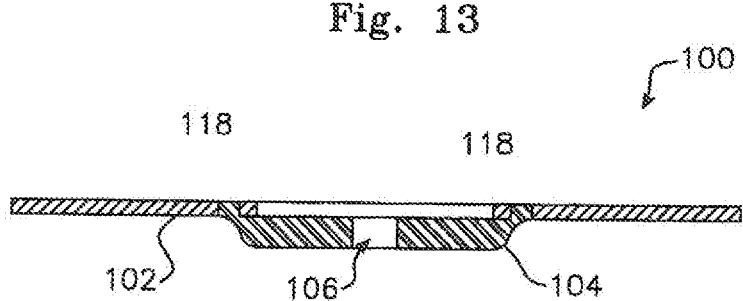
Figure 15:
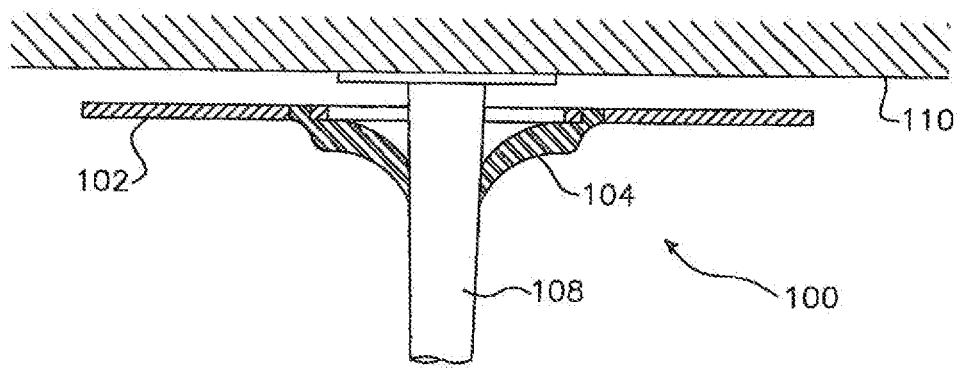

With reference now to FIGS. 12 to 15, an insect infestation reduction system 100 is disclosed comprising a dual ring assembly of a first outer-ring 102 and a second inner-ring 104, each outer and inner ring provided with a central aperture. The first outer ring 102 may be constructed of a semi-rigid plastic which is slippery and smooth, such as for example Teflon as described above, to prevent a bed bug (or other crawling insect) from traversing the first outer-ring. The second inner-ring 104 may be constructed of a soft, highly flexible plastic material or rubber to provide flexibility. The second inner-ring 104 may further comprise an aperture 106 to conform and surround and affix to a leg 108 of an article of furniture such as a bed base 110, and hold the ring assembly in place by friction, as shown in FIG. 15. Preferably, the second inner-ring 104 is constructed of a material with a sufficient softness and flexibility (e.g., Shore A 10-50, preferably near 20) to conform to the leg of an article of furniture without slipping, sliding or falling.

The second inner-ring may comprise a wide variety of shapes and/or sizes; the shape and/or size dependent upon the specific application. Such shapes and sizes may include (without limitation) round, square, triangular, hexagon, oval, or any other required shape. In a preferred embodiment, the inner diameter of the aperture 106 may be similar to the diameter of a common pencil. The aperture may have a larger diameter as needed for the specific application.

The first outer-ring and the second outer-ring may be affixed to each other by a variety of common methods. Such methods include the use of adhesive or other common bonding agents (e.g., chemical bonding, heat bonding, welding, brazing, etc.). Bonding of the first outer-ring and the second outer-ring may include casting on ring into/onto the other during manufacturing such that one ring is injected into the other.

Mechanical adhesion may also be used to affix the first outer-ring and the second inner-ring, where the first outer-ring and/or the second inner-ring include a mechanical feature. Mechanical adhesion may include instances where either the first outer-ring, the second inner-ring, or both may include open areas, pits, divots, tabs, or other like features. Other mechanical features may include interlocking rings on each the first outer-ring and the second-inner ring. The exact specifications, materials used, and method of use of the insect infestation reduction system may vary upon manufacturing.

Figure 12:
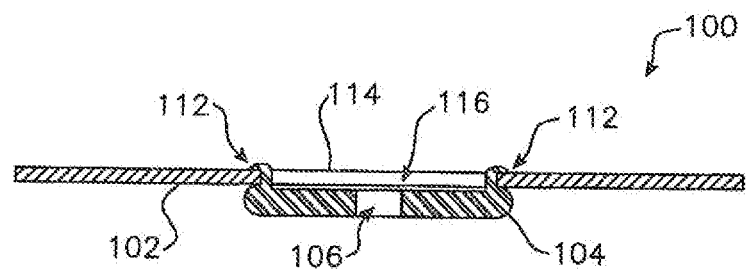
FIGS. 12 to 15 are cross section views of a still further embodiment of a bed bug or other creeping insect reduction method according to the invention.

In one preferred arrangement as shown in FIG. 12, the soft elastomer inner ring 104 is assembled to the outer ring 102 by mechanical means, such as a ridge and undercut 112 locking the inner ring to the inside rim 114 of the aperture 116 of the outer ring.

In an alternative arrangement as shown in FIG. 13, the two rings 102 and 104 are co-moulded in a two stage moulding operation within the one cavity of an injection moulding tool (not shown), In this arrangement the inner ring is automatically bonded to the outer ring.

In yet a further arrangement as shown in FIG. 14, the outer ring 104 is provided with a number of apertures 118 around the periphery of the aperture 116. The outer ring is moulded in a first operation and then placed in a second injection moulding cavity for the moulding of the inner ring. The soft elastomer of the inner ring fills the cavity but also intrudes into the apertures of the outer ring, locking the two rings into an assembly.

The invention claimed is:

1. A disc comprising:
   an outer ring having a top surface and a first central aperture forming an inner edge of the outer ring; and
   an inner ring having a second central aperture forming an inner edge of the inner ring, a first outer edge forming a perimeter of the inner ring, a top surface, and a member extending orthogonally away from the inner ring top surface along the perimeter of the inner ring, wherein
   the inner edge of the outer ring is affixed to the perimeter of the inner ring,
   the inner ring top surface and the member form a counterbore for the second central aperture,
   the first central aperture, the second central aperture, and the counterbore are coaxial, and
   the disc is applied to a leg of an item of furniture to form a substantially horizontal underside surface of the disc having properties that prevent a creeping insect from traversing the horizontal underside surface to prevent creeping insects from climbing up the leg to the item of furniture.

2. A disc in accordance with claim 1, wherein the item of furniture is a bed.

3. A disc in accordance with claim 1, wherein part of the member overlaps the outer ring top surface.

4. A disc in accordance with claim 1, wherein the disc has a low coefficient of surface friction.

5. A disc in accordance with claim 1, wherein the disc has a dynamic coefficient of friction less than 0.4.

6. A disc in accordance with claim 1, wherein the properties include a low coefficient of friction and resistance to van der Waal forces.

7. A disc in accordance with claim 1, wherein the disc is composed of polytetrafluoroethylene or a compound similar to polytetrafluoroethylene including Teflon®.

8. A disc comprising:
an outer ring having a top surface and a first central aperture forming an inner edge of the outer ring; and
an inner ring having a second central aperture forming an inner edge of the inner ring, a first outer edge forming a perimeter of the inner ring, a top surface, and a member extending orthogonally away from the inner ring top surface along the perimeter of the inner ring, the member comprising a groove, at least a portion of the inner edge of the outer ring being affixed to the inner ring and being fitted within the groove, the top surface of the inner ring and the member forming a counterbore for the second central aperture, and the first central aperture, the second central aperture, and the counterbore being coaxial, wherein the disc is applied to a leg of an item of furniture to form a substantially horizontal underside surface of the disc having properties that prevent a creeping insect from traversing the horizontal underside surface to prevent creeping insects from climbing up the leg to the item of furniture.

9. A disc in accordance with claim 8, wherein the item of furniture is a bed.

10. A disc in accordance with claim 8, wherein part of the member overlaps the outer ring top surface.

11. A disc in accordance with claim 8, wherein the disc has a low coefficient of surface friction.

12. A disc in accordance with claim 8, wherein the disc has a dynamic coefficient of friction less than 0.4.

13. A disc in accordance with claim 8, wherein the properties include a low coefficient of friction and resistance to van der Waal forces.

14. A disc in accordance with claim 8, wherein the disc is composed of polytetrafluoroethylene or a compound similar to polytetrafluoroethylene including Teflon®.

* * * * *